US011834522B2

(12) United States Patent
Anger et al.

(10) Patent No.: US 11,834,522 B2
(45) Date of Patent: Dec. 5, 2023

(54) METHYL-ETHYL-HYDROXYALKYL-CELLULOSE AND ITS USE IN BUILDING COMPOSITIONS

(71) Applicant: NOURYON CHEMICALS INTERNATIONAL B.V., Arnhem (NL)

(72) Inventors: Leif Magnus Joakim Anger, Ornskoldsvik (SE); Kjell Stridh, Surte (SE); Lars Erik Berglund, Arnasvall (SE); Alexander Zapf, Obfelden (CH)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 434 days.

(21) Appl. No.: 16/640,023

(22) PCT Filed: Aug. 14, 2018

(86) PCT No.: PCT/EP2018/071966
§ 371 (c)(1),
(2) Date: Feb. 18, 2020

(87) PCT Pub. No.: WO2019/034627
PCT Pub. Date: Feb. 21, 2019

(65) Prior Publication Data
US 2020/0262934 A1 Aug. 20, 2020

(30) Foreign Application Priority Data
Aug. 17, 2017 (EP) .................................. 17001404

(51) Int. Cl.
| | | |
|---|---|---|
| *C08B 11/193* | (2006.01) | |
| *C04B 24/38* | (2006.01) | |
| *C04B 28/04* | (2006.01) | |
| *C04B 40/00* | (2006.01) | |
| *C08L 1/28* | (2006.01) | |
| *C04B 103/44* | (2006.01) | |
| *C04B 111/00* | (2006.01) | |

(52) U.S. Cl.
CPC .......... *C08B 11/193* (2013.01); *C04B 24/383* (2013.01); *C04B 28/04* (2013.01); *C04B 40/0042* (2013.01); *C08L 1/284* (2013.01); *C04B 2103/44* (2013.01); *C04B 2111/00517* (2013.01); *C04B 2111/00637* (2013.01)

(58) Field of Classification Search
None
See application file for complete search history.

(56) References Cited

U.S. PATENT DOCUMENTS

| | | | |
|---|---|---|---|
| 1,589,607 A | 6/1926 | Lilienfeld | |
| 2,422,572 A * | 6/1947 | Lilienfeld | ............. D06P 1/0036 536/84 |
| 2,833,758 A * | 5/1958 | Kohler | ..................... C08B 11/20 536/85 |
| 3,926,951 A | 12/1975 | Lindenfors et al. | |
| 4,845,207 A | 7/1989 | t'Sas | |
| 5,234,968 A | 8/1993 | Debus et al. | |
| 6,593,468 B1 * | 7/2003 | Lange | ..................... A61Q 19/00 536/99 |
| 8,709,390 B2 | 4/2014 | Arisz et al. | |
| 2005/0000391 A1 * | 1/2005 | Rydgren | ............. C04B 40/0039 106/656 |
| 2005/0176951 A1 * | 8/2005 | Berglund | ................ C08B 11/02 536/84 |
| 2010/0186917 A1 | 7/2010 | Simonson et al. | |
| 2010/0258037 A1 | 10/2010 | Mann et al. | |
| 2011/0113989 A1 | 5/2011 | Brackhagen et al. | |
| 2012/0214887 A1 | 8/2012 | Stav et al. | |
| 2013/0193370 A1 | 8/2013 | Adden et al. | |
| 2014/0287148 A1 | 9/2014 | Kiesewetter et al. | |
| 2017/0114203 A1 * | 4/2017 | Narita | ..................... C08B 11/08 |
| 2018/0098941 A1 * | 4/2018 | Kitaguchi | ................ C08B 11/20 |
| 2018/0100027 A1 * | 4/2018 | Hirama | ..................... C08B 3/14 |
| 2018/0100028 A1 * | 4/2018 | Yokosawa | ............ A61K 9/2054 |

FOREIGN PATENT DOCUMENTS

| | | |
|---|---|---|
| CN | 1030590 A | 1/1989 |
| CN | 101160350 A | 4/2008 |
| CN | 101182139 A | 5/2008 |
| CN | 101652391 A | 2/2010 |
| CN | 105645865 A | 6/2016 |
| EP | 0929716 B1 | 10/2003 |
| EP | 1453863 B1 | 4/2007 |
| EP | 1587841 B1 | 4/2007 |
| EP | 1451126 B1 | 10/2007 |
| EP | 2177538 A1 | 4/2010 |
| GB | 459123 A | 12/1936 |

(Continued)

OTHER PUBLICATIONS

EPO, European Extended Search Report issued in European Patent Application No. 17001404.7, dated Jan. 31, 2018.
EPO, International Search Report and Written Opinion issued International Application No. PCT/EP2018/071966, dated Nov. 7, 2018.
Stead, J.B., et al. "A modified method for the analysis of oxyethylene/oxypropylene copolymers by chemical fission and gas chromatography", Journal of Chromatography, 1969, pp. 470-475, vol. 42.

*Primary Examiner* — John J Figueroa
(74) *Attorney, Agent, or Firm* — Lorenz & Kopf, LLP

(57) ABSTRACT

A methyl ethyl hydroxyalkyl cellulose (MEHEC), process for making the MEHEC, and a powder containing the MEHEC are disclosed. The MEHEC is provided with a DSmethyl from 1.5 to 2.5, a DSethyl from 0.005 to 0.15, and a MSalkylene-oxide from 0.005 to 0.2. The methyl ethyl hydroxyalkyl cellulose optionally includes an anti-oxidant. The MEHEC optionally does not have a combination of a DSmethyl of 2.2 or 1.8, a DSethyl of 0.05 or 0.1, and a MSalkylene-oxide of 0.1 and does not have a combination of a DSmethyl of 2.5 or 2.0, a DSethyl of 0.1, and a MSalkylene-oxide of 0.05. The MEHEC has very good biostability and is suitable for use in the building industry.

13 Claims, No Drawings

(56) References Cited

FOREIGN PATENT DOCUMENTS

| | | |
|---|---|---|
| KR | 20110089657 A | 8/2011 |
| KR | 1020120091696 A | 8/2012 |
| KR | 1020130067748 A | 6/2013 |
| KR | 1020130103883 A | 9/2013 |
| KR | 1016851800000 B1 | 12/2016 |
| WO | 03048070 A1 | 6/2003 |
| WO | 03048211 A1 | 6/2003 |
| WO | 2005105697 A1 | 11/2005 |
| WO | 2005105698 A1 | 11/2005 |
| WO | 2005105699 A1 | 11/2005 |
| WO | 2005105700 A1 | 11/2005 |
| WO | 2005105701 A1 | 11/2005 |
| WO | 2005105702 A1 | 11/2005 |
| WO | 2006094211 A1 | 9/2006 |
| WO | 2009018876 A1 | 2/2009 |
| WO | 2012080301 A2 | 6/2012 |
| WO | 2013085897 A2 | 6/2013 |
| WO | 2014009299 A2 | 1/2014 |
| WO | 2015059064 A1 | 4/2015 |
| WO | 2016011955 A1 | 1/2016 |
| WO | 2016154363 A1 | 9/2016 |
| WO | 2016156289 A1 | 10/2016 |

\* cited by examiner

METHYL-ETHYL-HYDROXYALKYL-CELLULOSE AND ITS USE IN BUILDING COMPOSITIONS

CROSS-REFERENCE TO RELATED APPLICATIONS

This application is a U.S. National-Stage entry under 35 U.S.C. § 371 based on International Application No. PCT/EP2018/071966, filed Aug. 14, 2018 which was published under PCT Article 21(2) and which claims priority to European Application No. 17001404.7, filed Aug. 17, 2017, which are all hereby incorporated in their entirety by reference.

TECHNICAL FIELD

The present invention relates to methyl-ethyl-hydroxyalkyl-cellulose containing hydroxyethyl groups (MEHEC), the process to make it, and its use in building compositions, particularly in mineral and non-mineral-based building compositions, including cementitious and gypsum-containing compositions. In such building materials the MEHEC allows for thickening of the mortars comprising it. Cellulose ethers have been promoted as additives for mortars, i.e. as a functional additive in making dry mortars for use in building applications. They comprise of a binder, typically a mineral binder such as cement and/or gypsum, fillers and/or aggregates with a grain size of up to 4 mm diameter and optionally further constituents, additives or adjuvants. The mortars are typically used as adhesive mortars and coating mortars.

BACKGROUND

Mortars often contain further additives to boost their performance. Thickeners, in particular water-thickeners, are a class of key ingredients which are added to increase the viscosity of the water-phase and thus provide mortars a suitable rheological profile. Conventional thickeners, i.e. conventional cellulose ethers, influence not only viscosity, but are known to also influence water retention, workability, adhesion, and/or stabilization of air pores.

There is a need for additives for mortars that can combine relevant application requirements, including excellent bulk density/air pore stability over time, extended open time/reduced skin formation/prolonged wetting, and consistency stability of the mortar while also having sufficient biostability.

It was therefore the objective of the present disclosure to provide a biostable mortar additive that gives said mortar a combination of excellent bulk density/air pore stability over time, extended open time/reduced skin formation/prolonged wetting, and consistency stability of the mortar. Preferably, the additives gives two or more benefits, when compared to conventional additives, selected from air pore stability, skin formation/wetting, and/or consistency stability. In addition, other objects, desirable features and characteristics will become apparent from the subsequent summary and detailed description, and the appended claims, taken in conjunction with the accompanying drawings and this background.

SUMMARY

A methyl ethyl hydroxyalkyl cellulose (MEHEC), process for making the MEHEC, and a powder containing the MEHEC are disclosed. The MEHEC is provided with a DSmethyl from 1.5 to 2.5, a DSethyl from 0.005 to 0.15, and a MSalkylene-oxide from 0.005 to 0.2. The methyl ethyl hydroxyalkyl cellulose optionally includes an anti-oxidant. The MEHEC optionally does not have a combination of a DSmethyl of 2.2 or 1.8, a DSethyl of 0.05 or 0.1, and a MSalkylene-oxide of 0.1 and does not have a combination of a DSmethyl of 2.5 or 2.0, a DSethyl of 0.1, and a MSalkylene-oxide of 0.05. The MEHEC has very good biostability and is suitable for use in the building industry.

Surprisingly it was found that the purpose of the disclosure can be achieved by very specific cellulose derivatives. More specifically, the cellulose derivatives of the invention are cellulose ethers with a very specific type and degree of substitution. Even more specifically, they are cellulose ethers with methyl, ethyl, and hydroxyalkyl substitution, with at least part of the hydroxyalkyl being hydroxyethyl, also known as MEHEC, with a methyl substitution such that 2.5 or 2.4, 2.3, 2.2, 2.1, 2.0>DSmethyl (DSm)>1.5, an ethyl substitution such that 0.005 or 0.01, 0.02, 0.04, 0.05<DSethyl (DSe)<0.15, and a substitution with alkylene oxide 0.005 or 0.01, 0.02, 0.04, 0.05<$MS_{AO}$<0.2, wherein DS(m)ethyl is the degree of substitution with (m)ethyl groups and $MS_{AO}$ is the molar substitution with hydroxyalkyl(ether) groups which are typically formed by reaction of an OH group of the AGU with one or more alkylene oxide (AO) molecules. Suitably the hydroxyalkyl groups include hydroxyethyl, and may comprise hydroxypropyl, and/or hydroxybutyl groups. For ease of manufacturing, in an embodiment the hydroxyalkyl groups are selected from hydroxyethyl groups and combinations thereof with hydroxypropyl groups. In an embodiment all hydroxyalkyl groups of the MEHEC of the invention are hydroxyethyl groups. In an embodiment the DSm is more than 1.55, 1.60, or 1.65. In an embodiment the DSm is 2.2 or less and more than 1.55, 1.60, or 1.65. The DS and MS, as used throughout this document is per anhydroglucose unit (AGU), typically substitution is on the 2, 3, and/or 6 position of the AGU. The degree of substitution of the methyl, ethyl, and hydroxyalkyl groups on the cellulose backbone, as claimed, was found to result in a very regular distribution of the substituents, particularly of the methyl groups, and, maybe because of that reason, to an improved biostability.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

WO 2009/018876 suggests MEHEC with a DSalkyl of 0.8-2.0 and a MSeo of 0.1-1.2. These products were surprisingly found to be outperformed by the cellulose ethers as claimed.

KR 1020110089657 suggests cement additive compositions (RPP) comprising MEHEC with a DSm and DSe of 0.1-2.9 and the MSeo is 0.01-2. Products as presently claimed were not disclosed or suggested. Also the presently claimed products were found to outperform the MEHEC disclosed therein.

WO 2005/105702 discloses MEHEC from raw cotton linter that has a DSm/e=0.5-2.5 and a MSeo=0.01-0.5. Products as claimed are not disclosed or suggested.

WO 2013/085897 relates to the use of mixtures of a cellulose ether and gelatin Products as claimed are not disclosed or suggested. In an embodiment, the MEHEC of the invention is not combined with gypsum and gelatin. In another embodiment, the MEHEC of the invention is not used in combination with gypsum and gelatin.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%.

The cellulose derivatives as used in this disclosure are cellulose ethers with a very specific type and degree of substitution as mentioned above in the summary. Due to the specific and high degree of substitution, the substituents are very evenly distributed over the AGUs of the cellulose. In an embodiment the distribution of all substituents is such that at least 75, 80, 85, or 90% by weight of all AGUs has 2 of its OH groups substituted. The substitution and distribution can be measured using conventional analytical methods, such as those involving partial or whole digestion of the cellulose ether, for instance using enzymes, the use of HBr and HI to react with the cellulose ether, or fragments thereof, in combination with GC-MS and/or thin layer chromatography. Also the conventional technique to determine unsubstituted trimers, as presented in WO 2006/094211 can be used to analyse for substitution patterns. However, also near infra red (NIR) analysis techniques were found to be useful. Advantages of using NIR analysis is that it can be in-line (allowing almost continuous measurements of the product), on-line (e.g. in a sample loop), and off-line (product samples taken and analyzed in the lab). Especially when NIR results are used with multivariate data analysis and proper background corrections, typically based on data obtained from earlier NIR spectra and data from conventional analysis, an accurate process control can be achieved resulting in a consistent and high quality end-product.

The MEHEC with very good biostability of the invention is suitably used in powder form. In an embodiment it is combined with additives in powder mixes. For instance, it is well known to combine the cellulose ethers with synthetic polymers, e.g. polyacrylamides and polyvinyl alcohols, in order to further improve the properties of the fresh cement mortars, as is mentioned in, for example, U.S. Pat. No. 5,234,968, herein enclosed by reference.

Suitably, the MEHEC powder or the mixtures are used for thickening cementitious mortars and providing the described benefits to the mortar.

The powder mixtures of the invention typically do not demix when handled the normal way. Thus, no special care needs to be taken for storage, transportation and processing.

Claimed also is a process to make a dry mortar and the dry mortar obtainable according to said process, comprising a hydraulic and/or latent hydraulic setting binder and the claimed MEHEC or MEHEC-containing powder mix by mixing. The resulting dry mortar may contain further ingredients which may be mixed in before, during and/or after the admixing of the mixture of the invention. Said dry mortar may, typically on the building site, be further mixed with water and allowed to cure.

It was surprising to find that the use of MEHEC of the invention, when compared to the use of conventional cellulose ethers in cementitious mortars, led to mortar formulations with better bulk density stability/air pore stability, better skin formation/wetting properties, similar water retention and shear stability, and better mortar rheology stability and consistency.

The MEHEC

As said, the MEHEC of the invention are cellulose ethers with a very specific type and degree of substitution, which were found to also have a very good biostability. The regular distribution of the substituents, particularly of the methyl groups is believed to be the reason for the improved biostability of the products. The MEHEC has a methyl substitution greater than 1.5 or 1.6, up to 2.5, 2.4, 2.3, 2.2, 2.1, 2.0, 1.9, 1.8, 1.75, or 1.7, suitably up to 2.5, 2.4, 2.3, 2.2, 2.1, or 2.0, with an ethyl substitution less than or equal to (<=) 0.15, down to 0.005, 0.01, 0.02, 0.04, or 0.05, and a substitution with alkylene oxide<=0.2, down to 0.005, 0.01, 0.02, 0.04, or 0.05, all per anhydroglucose unit.

This specific combination of substituents on the saccharide backbone, in particular the combination of the claimed (high) DSm in combination with the claimed (low) DSe and claimed (low) amount of MSao was found to lead to the desirable properties observed when using the MEHEC when making and using mortars.

In an embodiment the methyl ethyl hydroxyalkyl cellulose is not a product disclosed in WO 2003/048070. In an embodiment the methyl ethyl hydroxyalkyl cellulose does not have a combination of a DSm of 2.2 or 1.8, a DSe of 0.05 or 0.1, and a MSao of 0.1. In an embodiment the methyl ethyl hydroxyalkyl cellulose is not a product disclosed in WO 2003/048211. In an embodiment the methyl ethyl hydroxyalkyl cellulose does not have a DSm of 2.0, a DSe of 0.1, and a MSao of 0.05.

If the MEHEC is used in powder mixes with other components, for example to facilitate the dosing, or to increase dosing accuracy, the MEHEC is suitably present in such powder mixes in an amount of 5 to 90 percent by weight (wt %), preferably 10 to 80 wt %, in particular 15 to 75 wt %, based on the total amount of the powder mixture.

The MEHEC can be produced by reacting alkali cellulose with methyl chloride, ethyl chloride and alkylene oxide in accordance with the principles disclosed in the textbook: Ullmann's Encyclopedia of Industrial Chemistry, Fifth, Completely Revised Edition Volume A5, p 468-474. In the process the ratio of reactants can vary widely. In an embodiment, an excess of alkali relative to the degree of substitution on the final MEHEC, is used to make alkalicellulose with a higher number of activated anhydroglucose units in the cellulose, which are subsequently partially derivatized to get the desired level of substitution. In an embodiment the alkali used is NaOH, KOH or a combination thereof. The alkali may be used in diluted form, typically in water at a concentration of 1 to 50% by weight of the aqueous solution, or in a more concentrated form or even in the solid pure form, typically in the form of a hydrate, such that the alkali represents 50 to 100% by weight of the product. The more concentrated alkali products may require more intensive mixing, depending on how much water is present in the cellulose with which it is reacted. An advantage of using little water in the process was found to be a higher efficiency of alkalization. However, with little water, the use of inert media may be needed to facilitate mixing. Alternatively the temperature of the reaction mixture can be increased to give (partial) melting and better dissolution of the alkali or alkalihydrate. Hereinafter an anhydroglucose unit (AGU) in the cellulose is considered activated when said AGU contains at least one Na- and/or K-cellulose bond. In another embodiment the amount of alkali to activate the desired number of anhydroglucose units is 2.0, 2.5, 2.75, 3.0, 3.25, 3.5, 3.75, or 4.0 moles of alkali per AGU. The so-formed activated cellulose is then reacted with the methyl chloride, ethyl chloride and alkylene oxide (AO), The AO that is used is typically ethylene oxide (EO), but also propylene oxide (PO) and butylene oxide (BO), and other alkylene oxides can be used. The AO can also be a mixture of different alkylene oxides, such as mixtures of EO+PO, EO+BO, EO+PO+BO or mixtures including other alkylene oxides. In order to obtain the claimed products by the process, it is necessary to use more than 1.6, 1.75, 2.0 or 2.25 and up to 3.0, 3.5, 4.0, 4.5 or 5.0 moles of methyl chloride per mole of anhydroglucose units, whereby the larger molar excess of methyl chloride reduces reaction times. The amount of ethyl chloride to be used can vary over a wide range. Suitably it is used in an amount from 0.5, 0.75, 1, or 1.5 moles per AGU up to 5, 4, 3, or 2.5 moles per AGU, depending on when the ethyl chloride is dosed to the process and how much methyl chloride is present. If added early in the process (before 50% of the overall substitution is achieved), a lower amount can be used. If added later during the reaction it is suitably added in a higher amount. If no, or up to 50% of the total amount added methyl chloride is present when the ethyl chloride is reacted, the amount of ethyl chloride can be in the lower range. If more than 50% of the total amount of methyl chloride is present, the amount of ethyl chloride used is suitably in the higher range. If an overall excess (in moles per AGU) of methyl chloride, ethyl chloride and alkylene oxide is used in the process, relative to the amount (in moles per AGU) of alkali reacted with the cellulose to form the MEHEC of the invention, the reaction conditions are chosen such that the excess remains unreacted. In an embodiment the alkali is used in an amount at the lower end of the range, in combination with a molar excess of methyl chloride in the higher end of the range, which was found to reduce the formation of side products, allowing the reduction of impurities in the MEHEC. Most of the EtCl is preferably added as the first reactant unless gel level in the product gets too high. In that case, typically at least part of the EtCl is added after alkali has been introduced to the reactor. The sequence of additions of reactants can be any, and the alkali, methyl chloride, ethyl chloride and AO may be added in one portion or several portions, again in any sequence with the other (portions of) reactants. To save precious reactor time, it can be beneficial to add some of the reactants at the same time. In an embodiment at least part of the MeCl and at least part of the EtCl is added to the reactor at the same time. In order to reduce the amount of side products formed, it is preferred to have a low amount of NaOH present when the alkylene oxide is reacted. Since the NaOH is consumed in the reaction with MeCl and EtCl, in an embodiment the AO is added last. In an embodiment, the intermediate product is purified by evaporating the volatiles, or by washing, to remove impurities before the AO is added. This way the reaction of AO with said impurities can be prevented and a higher quality end-product results. Preferably the amount of alkali present when AO is added is preferably as low as possible, since the alkali is active as a catalyst. Suitably it is in the range of 0.8-1.5 mole of alkali per AGU. The amount of AO used in the process can vary over a wide range. Suitably an amount of AO from 0.005, 0.01, 005, 0.1, or 0.2 up to 0.3, 0.5, 0.75, 1.0 or 2.0 mole/AGU is used, depending on the reaction conditions. In order to speed up the reaction of the AO with the (alkali) cellulose the temperature during the reaction of the AO is suitable increased up to 80° C.

If so desired, the MEHEC, like other cellulose ethers may be crosslinked by using an agent with two groups that can react with OH groups of the cellulose backbone or reactive groups on any extender that is attached to the backbone. A typically crosslinking agent is glyoxal. However also other aldehydes, hydroxy (hemi)acetals, glyoxylic acid, epichlorohydrin, diglycidylethers, and the like can be used. For products that are to be readily water-soluble, typically only a minimal amount of crosslinking agent is used. As is conventional for crosslinking cellulose ethers, the reaction can be done in the reactor but also by spraying the particles with the crosslinking agent when outside of the reactor, such as on wet product before drying.

The MEHEC is usably dried after production. If an inert medium is used in the process, it is separated, often by flashing it off, and recycled to the reactor. The MEHEC is also suitable milled to the appropriate particle size. In one embodiment the drying, flashing and milling is combined, in this way a higher bulk density can be achieved. The MEHEC produced suitably has a tapped bulk density of at least 250 g/l, suitably more than 350 g/l or 400 g/l, determined according to Method II of the Stage 6 harmonization of the US Pharmacopeial Convention as official on Aug. 1, 2015.

The particle size of the dried and ground MEHEC is measured using a laser diffraction instrument like the Malvern MasterSizer or similar equipment. The MEHEC particle size is specified by intersection points on a cumulative distribution curve. Often the D10, D50, D90, D98 numbers are used. The particle sizes are given as the diameter of a sphere of equal total volume (=mass if density is constant) as the actual particle (which can be irregular in shape). Laser diffraction data and standard vibrating sieve data (as often used by others) are hence a bit different, but can be correlated to each other, at least approximately. For instance a D98 of 440 µm means that 98 weight percent of the solids are smaller or equal to 440 µm in diameter (as a sphere). For the MEHEC of the invention, the D10 and D98 value may vary. Some grades may be ground more to give finer, faster dissolving powders, while in other instances a coarser powder may be preferred and sold. Suitably the particle size ranges are as follows:

| Grade 1 | D10: 125-250 µm with | D98: 550-1070 µm, |
| Grade 2 | D10: 30-70 µm with | D98: 200-500 µm, |
| Grade 3 | D10: 30-50 µm with | D98: 130-300 µm, |
| Grade 4 | D10: 10-30 µm with | D98: 100-300 µm, and |
| Grade 5 | D10: 15-75 µm with | D98: 200-600 µm. |

For practicality reasons, and also in view of product quality, a particle size with a D50 is often preferred. However, equipment used and the product quality can dictate that a smaller particle size is preferred (such as a D50 of 200 micron) or a higher particle size (such as a D50 of 380 micron). The larger particles often have a higher gel content. In an embodiment grade 4 and 5 was found to be useful for use in mortars because of economics (relatively easy to sieve out), good biostability and good dispersing properties in dry mortar formulations, without segregation upon storage, and leading to good dispersing and rheological properties upon mixing with water. It was found that it is the combination of high substitution (methyl, ethyl, hydroxy) on the cellulose and the particle size distribution that results in good flow and handling properties as well as the good properties as reported for the grade 4 and 5 grades.

The crystallinity of the cellulose was found to be of little influence on the process, Hence a cellulose with any degree of crystallinity can be used for making the MEHEC of the invention. In an embodiment the crystallinity is less than 75, 60, 50, or 45%, as determined by Raman spectra in the region below 1600 cm-1 and calculated from the formula % crystallinity=I1481/(I1481+I1462), with I1481 being the band at 1481 cm-1, and I1462 being the band at 1462 cm-1. In an embodiment the cellulose is essentially amorphous.

The cellulose used is suitable provided in the form of cotton linters, wood pulp (hard, soft, or a mixture thereof), other cellulose sources, such as grasses, including bamboo, and other natural sources, or mixtures thereof. The various cellulose are not always of equal quality and therefore several batches are usually mixed before use. Since each cellulose source brings its own advantages and disadvantages, various celluloses can be combined to adjust the properties of the resulting MEHEC. For example, lignin levels may be selected to be low to prevent contamination, which can lead to discoloration, whereas sulphite-pulp-based cellulose is known to typically result in product with a higher viscosity. SUlfate-pulp-based cellulose is relatively cheap and often used to improve economics. It was surprisingly found that for processes involving reacting cotton linters it is advantageous to first add alkali and then methyl and ethyl chloride. The cellulose source, or mixture of celluloses, including hemicelluloses, is suitably selected based on price. The cellulose needs to be of a size so that reactants can access the cellulose in a good enough way. Typically the feed in grinded using a cutting mill, like the Netzsch-Condux SecoMy Cutting mill, or similar models from the same or other suppliers. Optionally the grinding is followed by a purification and/or wetting step. According to common practices, one or more, whole or partial, batches of ground or unground product can be stored and continuously mixed and or back-mixed in order to ensure a consistent quality of feedstock.

The ground cellulose can then be reacted with other chemicals in order to transform the cellulose from its native non-water soluble state to a water soluble state. This can be done in a high-pressure (+20 to 30 bars) version of a batch reactor like the Lodige Druvatherm DVT reactor, or similar, equipped with tube-shell heat exchangers for condensation of gas phase to liquid phase.

The grinding, optional purification and/or wetting, and reaction can each independently be continuous, semi-continuous, or in batch mode.

Suitably the reaction on the cellulose is performed in the presence of an inert organic reaction medium at temperatures between 60 and 115° C. In an embodiment, this medium comprises or consists of dimethylether, which is typically flashed from the final product and, if so desired, recycled in the process. In another embodiment dimethylether is formed in the process and part or all of the formed dimethylether is purged. In another embodiment an excess of methyl chloride and/or ethyl chloride is used in the process. In another embodiment the excess of methyl chloride and/or ethyl chloride is purged or recycled from the reaction product as appropriate. In another embodiment the recycle stream is purified. Suitably the purification involves the removal of part or all of the impurities formed in the process from the recycle stream.

Since the reaction takes place at elevated temperatures and pressures, with flammable reactants, whereby some corrosive by-products are formed, and whereby the content needs to be stirred properly in order to ensure a homogenous reaction mixture, the reactor is typically of very high quality, making reactor time rather expensive. To save time, warm or hot water may be used in order to form the reaction mixture. To reduce time in this reactor, part of the process may be done in one or more pre-reactors or parallel reactors. For example, the deaeration of the cellulose can be done in a pre-reactor. This pre-reactor can be a mixer, suitably a conical mixer, such as a Hosokawa Nauta mixer, wherein the cellulose powder is kept in motion, with nitrogen being blown thru from the bottom. On the pre-reactor a filter can be mounted to prevent that the fluffy cellulose is blown out of the pre-reactor. Also the reaction with the alkalizing agent can be done in a pre-reactor, which can be the same or different from the deaerator, optionally it is the same pre-reactor wherein also the deaeration is performed and wherein the alkalizing agent is preferably added in a zone of the pre-reactor where the oxygen has been expelled from the cellulose. Alternatively, the alkalization is done in a pre-reactor which is a continuous mixer, like an extruder, horizontal stirred tank, high-shear mixer, vertical (agglomerator) mixer, or combination thereof. Examples of suitable mixers include Turbulizer® ex Hosakawa Micron, Ploughshare® ex Lödige, and "Schugi® Flexomix" ex Hosakawa Micron. Some mixers have the advantage that they can also be used to cool or heat the reaction mixture, which is typically preferred. The advantage of such external mercerization, apart from a more efficient use of the reactor, is that the distribution of the alkalizing agent over the cellulose can be controlled more accurately, which improves the quality of the final MEHEC. In between the pre-reactor and the reactor, the product can optionally be purified. If the pre-reactor can handle pressure, then also MeCl and/or EtCl can be used in a pre-reactor. When this is done, then preferably alcohol is flashed off before the reaction mixture enters the reactor, to prevent the alcohol from reacting with EO. If part of the process is conducted in a pre-reactor then the amount of reactants used during the reaction in the reactor is adapted accordingly. If so desired, off-gases from the reactor can also be used in a pre-reactor to remove oxygen from the cellulose.

After the reaction in the reactor, excess volatiles are suitably evaporated and flashed from the cellulose ether. Suitably the gases are condensed and re-used in a pre-reactor or the reactor. Suitably the non-condensing gases are cleaned, optionally dissolved, or trapped, in an aqueous medium, and re-used.

Typically, the cellulose ether that is produced will form a suspension with the inert organic reaction medium. This resulting suspension can be emptied from the reactor to a stirred holding tank. The reactor can then be rinsed and/or flushed before re-use, with any removed volatiles suitably being recycled in the process. Rinsing can be done with clean water or recycled water. The suspension can be fed to a phase separating/washing machine, like a solid-bowl decanter or a rotary pressure filter, in order to purify it. Impurities such as alcohols, including glycol and alcohol-group-bearing ethers, like mono-alkyl glycol, can be removed. Other impurities that can be removed include, as mentioned earlier, ethers, and derivatives of any of the mentioned side products.

The still wet solids exiting the purification step can then, depending on the degree of substitution of the cellulose, be wetted further (for instance in a Ploughshare Mixer) if so desired, dried and milled in a one-step or two-step setup, using for instance a ring dryer (like the VetterTec Ring Dryer or similar) and a long gap mill (like the Jäckering/Altenburger Maschinen Ultra-Rotor or similar). The optional wetting, optional drying and optional milling can each independently be in batch or continuous mode. In an embodiment wherein a ring dryer is used, the wet cellulose ether is fed into the up-going air stream in the dryer to prevent clogging.

The dried solid powdery product can be collected in silos, optionally blended with other batches or other materials, like additives, in for instance the Hosokawa-Micron Nauta-Mixer, before being bagged in different bag sizes.

Since some parts of the process are run at elevated temperatures and since the final MEHEC is often stored at temperatures above 25, 35, or 45° C., it can be beneficial to add an antioxidant in the process to prevent thermal and/or oxidative degeneration of the MEHEC. For example, during milling and/or drying of the MEHEC, temperatures and shear can lead to degradation. The use of an anti-oxidant can reduce this phenomenon. Any anti-oxidant can be used for this purpose, including long-known compounds like 2,4-dimethyl-6-tert-butyl phenol and butylated hydroxytoluene. Storage stability of the MEHEC is best achieved by storing in a dry state (<1% of water) at temperatures below 30° C. However also other additives can be considered to be added, such as anti-caking agents (typically silica), water absorbents, such as polyacrylamides, defoamers and pH buffers (salts) as is conventionally done when making cellulose ethers.

In an embodiment the MEHEC of the invention is water-soluble at a temperature up to the cloud point. In an embodiment the cloud point is at a temperature above 10, 20, 30, 40, 50, 60, 70, 80, or 90° C. for ease of processing. In an embodiment the cloud point is at a temperature above 50, 60, 70, 80, or 90° C. since it will allow faster dissolution rates. For MEHEC of the invention, the speed of dissolution was found to be a function of temperature, particle size, whether or not glyoxal had been added to it to provide temporary cross-links, and/or the presence of dissolution retarding chemicals (i.e. acids and salts). To analyse for dissolution speed, at a predefined temperature, suitably the viscosity of a stirred mixture of MEHEC and a buffer solution is monitored over time by continuous viscometry. The time for reaching 10% of the final viscosity of the solution is called t1, whereas t2 is the time for reaching 95% of the final viscosity. Herein a viscometer of the type Rheomat® RM 180 ex Maple Instruments, equipped with measuring system cup and anchor stirrer, referred to by the supplier as "Special relative System type 72", and of which the output is recorded, is used. The temperature of the measuring cup is controlled at 20° C. using a water bath with thermostat. 0.5 grams of MEHEC powder is added to the measuring cup of the viscometer, the rheometer is fitted, and the cup is place in the water bath. The stirring of the rheometer is started at 425 rpm. Then 50 ml of a buffer solution with a temperature of 20° C. is added and the recoding of the viscosity is started. The process and data collection was controlled using RSI Orchestrator software. The buffer is buffered at pH 7.0 using "Phosphate buffer pH 7" ex Labservice AB. The viscosity is measured until a stable (final) viscosity is achieved. If the product dissolved with lump formation, then the test conditions are changed and the measuring cup of the rheometer is filled with 0.5 g of MEHEC and 5 g of acetone, before the buffer solution is added. The t1 value is the time (in minutes) until the starting viscosity increased with 10% of the total increase to the final viscosity. The t2 value is the time (in minutes) for the viscosity to reach 95% of the final viscosity.

In an embodiment, the MEHEC of the invention has a T1 value of from 0.1, 0.2, or 0.3 up to 0.4 or 0.5 minutes and a T2 value of from 1, 2, or 3 minutes up to 5, 6, 8, or 10 minutes As indicated, the MEHEC of the invention was found to have excellent biostability. The improved biostability improved the already good storage stability of mortars containing the cellulose ether. As used herein, biostability is defined to be the retention of the viscosity of an aqueous solution of the cellulose ether after addition of enzyme. Hereto, the viscosity of 50 ml of a 1 wt % cellulose ether solution in water, which is buffered at pH 7 using 2.5 g monopotassium phosphate per litre and the appropriate amount of KOH, is kept and analysed at a temperature of 20° C. using the Rheomat RM 180 viscometer equipped with the system cup and anchor stirrer at 425 rpm. With continuous measuring (hence stirring) over the whole time, the viscosity of the cellulose ether solution is measured before (the original viscosity) and 1 hour after addition of 0.25 ml of a solution (150 units/100 ml) of Cellulase E.C. 3.2.1.4 from *Aspergillus niger*, ev Sigma Chemical Co per 50 ml of cellulose solution. If the viscosity of the original solution is below 400 mPa·s a 2 wt % solution of the cellulose ether is to be used instead of the 1 wt % solution. The viscosity 1 h after enzyme addition divided by the original viscosity times 100% is the biostability. Good biostability is achieved when 70-80% of the original viscosity is retained. Very good biostability is achieved when 80-85% of the viscosity is retained. Excellent biostability is achieved when more than 85% of the viscosity is retained in the test.

In mortars, the MEHEC is typically used in an amount of about 0.01 to 3 wt %, suitably it is used in an amount 0.1-0.5 wt %.

The MEHEC can provide a specific rheological profile to the building material, which depends, inter alia, on its molecular weight. However for providing the benefits as described herein, the molecular weight of the MEHEC and the viscosity of a solution of the MEHEC was found to be of a lesser importance. More particularly, any MEHEC was found to provide the benefits to the mortar, irrespective of the molecular weight. Hence, the molecular weight of the MEHEC of the invention can vary over a wide range. In an embodiment, the MEHEC has a Brookfield LV viscosity, using a spindle 61-64, of at least 300, 500, 750, or 1000 mPas, up to 200,000, 150,000, 100,000, 75,000, 50,000, 37,500, 25,000, or 12,500 mPas, measured at 20° C./12 rpm on a 2 wt % aqueous solution in distilled water at pH 12. The pH is controlled by using an aqueous NaOH-solution.

Additives

Additives which can be mixed with the MEHEC for use in mortars, includes all additives as used when making mortars. For mixing with MEHEC, the additives preferably are in the form of a powder, or result, after mixing with the MEHEC, in a powder. In an embodiment they are selected from organic acids and bases and/or their salts, fungicides, bactericides, algicides, biocides including microbiocides, odorants, air entraining agents, wetting agents, defoamers or anti-foaming agents, surfactants, film-forming agents, shrinkage reducing agents, agents to reduce efflorescence, agents to control cement hydration such as setting and solidification accelerators, setting and solidification retarders, dispersing agents, cement superplasticizers, polycarboxylates, polycarboxylate ether, cellulose fibres, and film-forming water-insoluble polymers. Suitable the additives are selected from fillers, fluoroorganic-substituted silicon compounds, organosilicon compounds, such as alkylalkoxysilanes, inorganic acids, fatty acid, fatty acid salt, fatty acid derivative, such as esters, amides and anhydrides thereof, diterpene, derivative of diterpene, quaternary ammonium salt, glycol ethers, anti-caking agents, polymers, and mixtures thereof. The mixtures of MEHEC and additives for mortars are often marketed as "redispersible powders", meaning they can be added to mortars and easily redispersed in said mortar.

Fluoroorganic-substituted silicon compounds can provide oleophobic properties to the mortar, organosilicon compounds hydrophobized the mortar and can lead to "easy-to-clean" properties, diterpene and/or derivatives thereof provide a reduced tendency for efflorescence in the cured mortars, as well as reduced water absorption of the mortar matrix.

Examples of suitable fillers are aluminosilicate, silicon oxide, silicon dioxide, aluminium silicon oxide, silicates, including layered silicates, such as calcium silicate hydrate, aluminium silicate, magnesium silicate, magnesium silicate hydrate, magnesium aluminium silicate hydrate, mixtures of silicic acid anhydrite and kaolinite, aluminium silicate hydrate, calcium aluminium silicate, calcium silicate hydrate, and aluminium iron magnesium silicate, carbonates, calcium carbonate and calcium magnesium carbonate, calcium metasilicate, titanium dioxide, expanded perlite, cellite, cabosil, circosil, aerosil, eurocell, fillite, promaxon, clays, such as china clay and bentonite, dolomite, limestone powder, chalks, vulcanic slag, pozzolanes such as fly ash, metakaolin, light-weight fillers such as for instance hollow microspheres of glass, and/or precipitated silicas. In an embodiment, the filler is selected from silicate, silicon dioxide, silica fume, fumed silica, carbonates, kaolin and/or china clay. In an embodiment the filler is selected from silicate, silicon dioxide and/or fumed silica. In an embodiment the fillers have a natural or artificially generated colour.

Examples of polymers include water-soluble polymers, such as polyvinyl pyrrolidones and/or polyvinyl acetals with a molecular weight of 2,000 to 400,000, fully or partially saponified polyvinyl alcohols, also simply known as polyvinylalcohol, or as partially or fully hydrolysed polyvinylacetates, and their derivatives, which can be modified for instance with amino groups, carboxylic acid groups and/or alkyl groups, with a degree of hydrolysis of preferably about 70 to 100 mol. %, in particular of about 80 to 98 mol. %, and a Höppler viscosity in 4% aqueous solution of preferably 1 to 100 mPas, in particular of about 3 to 50 mPas (measured at 20° C. in accordance with DIN 53015), as well as melamine formaldehyde sulfonates, naphthalene formaldehyde sulfonates, polymerizates of propylene oxide and/or ethylene oxide, including their copolymerizates and block copolymerizates, styrene-maleic acid and/or vinyl ether-maleic acid copolymerizates. Preferred synthetic water-soluble polymers are fully or partially saponified polyvinyl alcohols and their derivatives, polyvinyl pyrrolidone, polyvinyl acetal, melamine formaldehyde sulfonates, naphthalene formaldehyde sulfonates, polymerizates of propylene oxide and/or ethylene oxide, including their copolymerizates and block copolymerizates, styrene-maleic acid and vinyl ether-maleic acid copolymerizates. Most preferred are partially saponified, optionally modified, polyvinyl alcohols with a degree of hydrolysis of 80 to 98 mol. % and a Floppier viscosity as 4% aqueous solution at 20° C. of 1 to 50 mPas and/or polyvinyl pyrrolidone. In one preferred embodiment, at least 50 wt %, preferably at least 75 wt %, of the polyvinyl alcohol employed has a molecular weight, measured as Mw, of 100,000 or less, in particular of 75,000 or less, most preferably of 50,000 or less.

Water-soluble polymers also include biopolymers or chemically modified biopolymers include polysaccharide, polysaccharide ether, cellulose ethers other than the claimed MEHEC, guar ether, starch, starch ether, alginate, carboxymethyl cellulose, agar-agar, carob seed grain, pectin, gelatine and soy protein. Preferred are dextrines, cellulose ethers other than MEHEC, guar ether and starch ether having a Brookfield viscosity of less than 500 mPas, measured at 20° C. and 20 rpm as a 2 wt % aqueous solution having a pH of 7.

Suitably, the various additives, including the MEHEC of the invention, are simply mixed. However, if one or more of the additives are in an aqueous form, then they have to be dried in order to make powders. The additives in aqueous form may be combined before drying. If one or more additives in aqueous media is used, then the MEHEC, moist or dried, can be added to the aqueous medium before or during the drying step. The drying of the admixture of components, when an aqueous medium is used in the mixing, can take place by means which are well known to the skilled person. Preferred are spray drying, including pulse combustion spray drying, freeze drying, fluidised bed drying, drum drying, dry grinding and/or flash drying. Spray drying is preferred.

The polymer may also be a water-insoluble polymer, being polymers with a water solubility, measured at 20° C. and in distilled water and at pH 7, is 4 g/l or lower, in particular 1 g/l or lower. Preferred water-insoluble polymers comprise water-redispersible polymer powders, which typically may be obtained by drying, in particular spray drying, emulsion and/or suspension polymerizates. Preferred emulsion and/or suspension polymerizates are (co)polymers of olefinically unsaturated monomers. The latter preferably comprise monomers from the group of vinyl acetate, ethylene, acrylate, methacrylate, vinyl chloride, styrene, butadiene and/or C4-C12, in particular a C9-C11, vinyl ester monomers. Suitable compounds are based on vinyl acetate, ethylene-vinyl acetate, ethylene-vinyl acetate-vinyl versatate, ethylene-vinyl acetate-(meth)acrylate, ethylene-vinyl acetate-vinyl chloride, vinyl acetate-vinyl versatate, vinyl acetate-vinyl versatate-(meth)acrylate, vinyl versatate-(meth)acrylate, pure (meth)acrylate, styrene-acrylate and/or styrene-butadiene. In an embodiment the water-insoluble organic polymer is a film-forming binder based on olefinically unsaturated monomers selected from vinyl(co)polymers, polyurethanes, poly(meth)acrylates, polyesters, polyethers, and mixtures and hybrids thereof.

The polymerizates can contain about 0-50 wt. %, in particular about 0-30 wt. %, and quite especially preferably about 0-10 wt. % of further monomers, in particular monomers with functional groups.

In an embodiment, said polymerizates and the water-redispersible polymer powders are film-forming at a temperature of 23° C. or higher; preferably at 10° C. or higher; in particular at 5° C. or higher. Film-forming means that the copolymer is capable of forming a film determined according to DIN ISO 2115.

It is noted that any combination of any one or more embodiments as disclosed above is contemplated for forming a mixture in accordance with the invention, whereby each combination is preferred.

The Dry Mortar

The dry mortar, which is according to the invention a preferred building material composition, is made using a MEHEC of the invention in an amount of 0.02 to 4 wt %, based on the total amount of the dry and uncured mortar, and a binder, wherein the binder is a mineral and non-mineralbased building compositions, such as a cementitious and/or gypsum-containing composition which typically hardens due to the action of water. Such binders are herein also referred to as hydraulic and/or latent hydraulic binders. The dry mortar according to the invention has a grain size of not more than 4 mm, i.e. at least 98 wt % of the dry mortar passes a sieve having a mesh of 4 mm.

In an embodiment, the binder in the dry mortar amounts 6 to 60 wt %, preferably 10 to 60 wt %, in particular 12 to 50 wt %, based on the total amount of solid components of the uncured mortar. In a particularly preferred embodiment, the binder is cement.

According to the invention, the binders suitably set and harden by chemical interaction with water. In an embodiment the binder is capable of doing so under water.

According to the invention, latent binders set by the addition of an activator, usually lime, and water.

The binder suitably comprises a) hydraulically setting binders, in particular cements, activated blast furnace slags and/or silico-calcareous fly ash and/or b) a latent hydraulic binder, such as in particular pozzolanes and/or metakaolin, which reacts hydraulically in combination with a calcium source such as calcium hydroxide and/or cement.

Preferred cements are in particular Portland cement, for instance in accordance with EN 197-1 CEM I, II, III, IV, and V, and/or calcium phosphate cement and/or aluminous cement such as calcium aluminate cement and/or calcium sulfo-aluminate cement.

Preferred latent hydraulic binders or pozzolanes are metakaolin, burnt shale, diatomaceous earth, moler, rice husk ash, air cooled slag, calcium metasilicate and/or volcanic slag, volcanic tuff, trass, fly ash, silica fume, microsilica, blast-furnace slag and in particular ground granulated blast-furnace slag, and/or silica dust.

Particularly preferred binders are hydraulically binding, i.e. setting, materials, in particular Portland cement, or a mixture of Portland cement, calcium aluminate cement, and gypsum.

The dry mortar may comprise in addition to the binder and the mixture according to the invention, one or more fillers and as well as further components, which may be the same or different to the adjuvants iii) from the powder mixture according to the invention.

The dry mortar may comprise in addition further components, which may be the same or different to the additives added to the powder mixture according to the invention. The skilled person is well aware of these components and is well skilled to choose the optimal amounts to fine-tune the application properties of the dry mortar after being mixed with the required amount of water.

By doing so, he is able to formulate dry mortars according to the invention and use said dry mortar, upon mixing with water, as coating or composite mortar, thermal insulation mortar, base coat mortar, adhesive mortar, decorative mortar, such as e.g. putty, skim coat, renders or monocouche, sealing compound, lime and/or cement plaster, repair mortar, joint adhesive, ceramic tile adhesive, plywood mortar, bonding mortar, cement primer, cementitious coating for concrete, powder coating, parquet adhesive, smoothing compound, troweling compound and/or masonry mortar.

Apart from the embodiments as claimed, non-hydraulic binders may be considered which react under the influence of air and water, in particular calcium hydroxide, calcium oxide, quicklime, hydrated lime, magnesia cements, water glass and/or gypsum, by which is meant e.g. calcium sulfate in the form of α- and/or β-semihydrate and/or anhydrite of form I, II and/or III.

The term "consisting" wherever used herein also embraces "consisting substantially", but may optionally be limited to its strict meaning of "consisting entirely".

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Where upper and lower limits are quoted for a property, for example the DSm, then a range of values defined by a combination of any of the upper limits with any of the lower limits may also be implied.

It should be appreciated that the various aspects and embodiments of the detailed description as disclosed herein are illustrative of the specific ways to make and use the invention and do not limit the scope of invention when taken into consideration with the claims and the detailed description. It will also be appreciated that features from different aspects and embodiments of the invention may be combined with features from any other aspects and embodiments of the invention.

EXAMPLES

The invention is further elucidated by the following Examples. Unless indicated otherwise, the tests with mortar are carried out at a temperature of 23° C. and a relative humidity of 50%.

Several comparative MEHEC and MHEC cellulose ethers were used in the examples. Their analysis showed the following:

| Product | DSm | DSe | MSeo | MSpo |
|---|---|---|---|---|
| Tylose ® MB3003P6 | 1.34 | 0 | 0.04 | 0.11 |
| Tylose MH15002P6 | 1.57 | 0 | 0.23 | 0 |
| Tylose MP6002P4 | 1.53 | 0 | 0.22 | 0 |
| Culminal ® C9166 | 1.35 | 0 | 0.22 | 0.13 |
| Culminal MHPC20000PR | 1.78 | 0 | 0.01 | 0.09 |
| BERMOCOLL ® M30 | 1.32 | 0.18 | 0.29 | 0 |

Tylose products are available from Tylose. Culminal products are available from Ashland. M30 is a commercially available Methyl Ethyl Hydroxyethyl Cellulose from AkzoNobel in powder form. All do not have a combination of DSm and DSe as presently claimed.

The DSm and DSe were determined in the conventional way after cleaving the methyl and hydroxyethyl substituents of the cellulose ether at 150° C. with HI or HBr, with the resulting MeI and EtI, or MeBr and Br—(CH2)2-Br, respectively, analyzed by GC-FID or GC-MS, using toluene as the internal reference. The DSao is suitably determined using the procedure set out in Stead, J. B., & Hindley, H., (1969) "A modified method for the analysis oxyethylene/oxypropylene copolymers by chemical fission and gas chromatography" Journal of Chromatography, 42, 470-475.

Examples 1a-k: Preparation of MEHEC of the Invention

Ex 1a: 8 kg cellulose (49.4 moles of AGU) was charged to a stirred reactor and oxygen was removed by three times pulling vacuum and filling with nitrogen. Then 8 kg (2.5 mole/AGU) of ethyl chloride was added and 3.2 mole/AGU of methyl chloride. If a recycle stream is used, it can be added now. If desired an inert medium reaction medium is added, for instance to increase the heat transfer and to avoid hot spots in the reactor. The recycle stream can contain such inert medium. A 50% NaOH solution in demi-water was made and 1.4 mole of NaOH/AGU was added in 8 minutes. The reactor content was brought to 30° C. Then 578 g (0.26 mole/AGU) of EO was added and the reactor heated with 2° C./min to 70° C. The pressure rises during the heat-up to about 9 barg. Additional 8.0 kg (2.0 mole/AGU) of the 50% NaOH solution and 3.5 kg (1.42 mole/AGU) of methyl chloride was added simultaneously and continuously over a 35 minute period, to keep pressure controlled. The molar excess of methyl chloride, with respect to NaOH at this point is about 30%. Thereafter the reactor was heated to 95° C. in 25 minutes and kept at this temperature for 30 minutes after which excess of unreacted methyl and ethyl chloride, as well as volatile side-products are removed by gassing. The recycle stream, optionally after removal of undesired compounds, can be fed into the next batch, with compensation of the added amount of reactants for the amount of reactant introduced by the recycle stream. Lowering the reaction temperature may have an influence on the amount of side products formed, but then cycle times will typically increase. The product had a DSm of 1.81, a DSe of 0.06, a MSeo of 0.18, and a viscosity of 3970 mPas (Brookfield LV, 1% solution at 20° C., at 12 rpm).

The example was repeated using various cellulose sources and varying the pressure and total amount of MeCl, NaOH, and EO used as mentioned in the table. Where reactants are added in two or more portions, the ratio between the portions was the same ratio as in example 1a.

| Test | MeCl * | NaOH * | EO * | reaction pressure | DSm | DSe | MSeo | Viscosity (mPa · s) |
|---|---|---|---|---|---|---|---|---|
| 1b | 3.9 | 3.5 | 0.27 | 9 barg | 1.66 | 0.06 | 0.13 | 3980 |
| 1c | 4.25 | 3.5 | 0.27 | 9 barg | 1.76 | 0.06 | 0.18 | 2510 |
| 1d | 3.9 | 3.5 | 0.27 | 10 barg | 1.67 | 0.06 | 0.14 | 3850 |
| 1e | 4.25 | 3.5 | 0.27 | 10 barg | 1.79 | 0.06 | 0.19 | 3670 |
| 1f | 3.48 | 3.5 | 0.27 | 10 barg | 1.58 | 0.06 | 0.21 | 7050 |
| 1g | 5.08 | 3.5 | 0.27 | 10 barg | 1.74 | 0.03 | 0.03 | 2850 |
| 1h | 3.49 | 3.5 | 0.28 | 10 barg | 1.70 | 0.10 | 0.21 | 3850 |
| 1i | 4.06 | 3.1 | 0.28 | 10 barg | 1.75 | 0.07 | 0.16 | 4170 |
| 1j | 4.62 | 3.5 | 0.14 | 10 barg | 1.85 | 0.06 | 0.14 | 4730 |
| 1k | 4.62 | 3.6 | 0.28 | 10 barg | 1.73 | 0.08 | 0.18 | 3610 |
| 1l | 5.06 | 4.1 | 0.27 | 10 barg | 1.74 | 0.06 | 0.20 | 2870 |

* = mole/AGU

Examples 1b-c show that the MEHEC can be produced at 9 barg if desired.

Examples 1d-g show that the amount of MeCl can be varied while still getting the desired product.

Examples 1f-g were made using a different cellulose source, showing that different celluloses can be used.

Examples 1f and h show that it is possible to make the claimed MEHEC also using an amount of MeCl that is lower than the molar amount of NaOH that is used.

Examples i-j show that the amount of EO can be varied without upsetting the amount of alkylether formation.

Examples 1k and 1l were run at larger scale, confirming that the same results can be achieved at larger scale.

The particle size of the MEHEC particles was found to vary and for all examples, the following data was found,

|  | MIN | AVG | MAX |
|---|---|---|---|
| D98 | 280 | 400 | 500 |
| D90 | 160 | 250 | 340 |
| D50 | 60 | 85 | 200 |
| D10 | 20 | 30 | 60, | whereby the products showed a better biostability ranging from 81 to 93% compared with conventional products with a lower DSm of typically 50-60%.

Example 2: Preparation of Dry Mortar Master Batch TM-1

Prepared were 5 kg of a cement-based dry mortar master batch consisting of 15 pbw of commercially available Portland cement CEM I 52.5R, 15 pbw of ChinaClay Polwhite C (ex Imerys), 1.5 pbw of Elotex FX2320, a commercial additive of Akzo Nobel, and 68.5 pbw of a quartz sand (0.1-1.2 mm) (ex Carlo Bernasconi AG), in which process the components were mixed in a 10 l vessel with a FESTOOL RW1000 EQ stirrer until a homogeneous dry mortar master batch was obtained. The typical water demand of these mortars is 24%.

Application Specific Testing:

If not indicated otherwise the mortar mixtures indicated in the examples (parts by weight) were mixed in a Hobart mixer according to the following procedure: Amount of water was added to the Hobart mixer, dry mortar mix TM-1 and the cellulose ether powder was added to the water during 30 seconds while mixing on level 1, 30 seconds mixing by hand, 45 seconds mixing on level 1, 3 minutes maturing time, finally 15 second on level 1. Total mixing time including maturing=5 minutes Example 3: Bulk Density Stability For bulk density evaluations a calibrated 200 ml beaker was used. The calibrated beaker is weighed, completely filled with the mortar mixture and weighed again. The final mortar density in g/cm3 (=kg/dm3) is calculated as follows: Mortar density=Mass (total)−Mass (Beaker)/Volume (Beaker)

The density is measured directly after completion of mixing (=after 5 minutes) and 30 minutes after completion of mixing process Test formulation was as follows (parts by weight): 99.85% of TM-1, 0.15% of the MEHEC of example 1 or the competitive products, respectively. Mixing water was 24%.

|  | MEHEC of Ex 1a | Bermocoll M30 | Tylose MH15000P6 | Culminal MHEC15000PFF | Walocel MKX15000PF01 |
|---|---|---|---|---|---|
| After 5 min (kg/dm3) | 1.58 | 1.57 | 1.70 | 1.69 | 1.77 |
| After 30 min (kg/dm3) | 1.60 | 1.63 | 1.76 | 1.74 | 1.83 |

-continued

|  | MEHEC of Ex 1a | Bermocoll M30 | Tylose MH15000P6 | Culminal MHEC15000PFF | Walocel MKX15000PF01 |
| --- | --- | --- | --- | --- | --- |
| Difference between 5 and 30 min (g/dm3) | 20 | 60 | 60 | 50 | 60 |

The difference in bulk density between 5 and 30 minutes is a measure for the air pore stability of the mortar mixture. The MEHEC according to the invention shows a significant improvement in bulk density stability and thus air pore stability compared to competitive grades.

Example 4: Mortar Consistency Stability

For mortar consistence the spreading (in mm) after 15 jolts was measured according to EN1015-3. The spreading was measured directly after completion of mixing (=after 5 minutes), 30 minutes after completion of mixing process and additionally 30 minutes after mixing+3 minutes additional shearing in the Hobart mixer on level 2. Test formulation was as follows (parts by weight): 99.85% of TM-1, 0.15% of the MEHEC of example 1 or the competitive products, respectively. Mixing water was 24%.

|  | MEHEC of Ex 1a | Tylose MH15000P6 | Culminal MHEC15000PFF | Walocel MKX15000PF01 |
| --- | --- | --- | --- | --- |
| After 5 min | 158 | 158 | 157 | 163 |
| After 30 min | 156 | 154.5 | 152 | 160 |

-continued

|  | MEHEC of Ex 1a | Tylose MH15000P6 | Culminal MHEC15000PFF | Walocel MKX15000PF01 |
| --- | --- | --- | --- | --- |
| After 3 min shear | 155 | 154 | 148 | 153 |

The MEHEC according to the invention shows a significant improvement in consistency stability compared to competitive grades.

Example 5: Mortar Rheology

For analysing the stability of the mortar, the consistence of a thin spread layer was evaluated directly after mixing (=after 5 minutes) and 60 minutes after mixing. The mortar mixture was therefore applied with the aid of spacers in a layer thickness of 5 mm on a cement fiber board. The surface quality was assessed subjectively after application according to the following criteria:

++ very good—extremely smooth and homogeneous surface—no pores or craters
+ good—smooth surface—a few pores or craters
o average—uneven surface—lots of craters and pores
− bad, extremely porous and uneven surface, lots of craters and pores Test formulation was as follows (parts by weight): 99.85% of TM-1, 0.15% of the MEHEC of example 1 or the competitive products, respectively. Mixing water was 24%.

| CE | MEHEC of Ex 1a | Bermocoll M30 | Tylose MH15000P6 | Culminal MHEC15000PFF | Walocel MKX15000PF01 |
| --- | --- | --- | --- | --- | --- |
| After 5 min | ++ | + | ++ | ++ | ++ |
| After 60 mins | ++ | − | (+)+ | o | o |

The MEHEC of the invention shows a clearly better mortar rheology and mortar stability.

Example 6: Wetting/Skin Formation

Mixed mortar was applied on a 2 cm thick EPS (Expanded Polystyrene) board with a density of 20 kg/m3 (F20) with a 8×8 mm trowel. Each 5 minutes starting from the application of the mortar on the board (T=0 min) EPS F20 cubes of 5×5 cm are put in the mortar bead (0, 5, 10, 15, 20, 25, 30 minutes). Each EPS cubes is loaded after application with 1 kg for 30 seconds. 5 minutes after the last EPS cube was put in the mortar bead (=35 minutes after application of the mortar) all cubes are removed from the mortar bead and the wetting of the mortar on the backside of the EPS cube (area % wetted by the mortar) is evaluated.

Test formulation was as follows (parts by weight): 99.85% of TM-1, 0.15% of the MEHEC of example 1 or the competitive products, respectively. Mixing water was 24%.

| CE | MEHEC of Ex 1a | Bermocoll M30 | Tylose MH15000P6 | Culminal MHEC15000PFF | Walocel MKX15000PF01 |
|---|---|---|---|---|---|
| T = 0 min | 100 | 100 | 100 | 100 | 100 |
| T = 15 min | 80 | 80 | 60 | 70 | 50 |
| T = 20 min | 80 | 70 | 65 | 70 | 40 |
| T = 25 min | 80 | 50 | 50 | 60 | 30 |
| T = 30 min | 70 | 20 | 15 | 30 | 10 |

It can be concluded that the inventive MEHEC significantly reduces skin formation and thus improves wetting of mortar/substrate interface.

Example 7: Water Retention

The water retention of the mixed mortar was evaluated according to DIN 18555-7. The test was performed at 23° C., 50% r.H., the water retention was measured after 30 minutes.

| CE | MEHEC of Ex 1 | Bermocoll M30 | Tylose MH15000P6 | Culminal MHEC15000PFF | Walocel MKX15000PF01 |
|---|---|---|---|---|---|
| Water retention after 30 min [%] | 97.4 | 97.2 | 97.5 | 97.3 | 97.4 |

Conclusion was that the new MEHEC leads to comparable water retention.

Example 8: Adhesive Strength

The mortar mixture was applied with the aid of spacers in a layer thickness of 3 mm on an EPS F20 board (6×10×50 cm). After application the test specimens were stored for 28 d at 23° C. and 50% r.H. One day before end of the storage time the test specimen were drilled out with a crown driller (inside diameter 50 mm) in a deepness of approx. 5 mm into the EPS. Metal plates (50 mm diameter, 5 plates per EPS board) were fixed with an appropriate adhesive on the mortar surface. After end of the storage the adhesive strength (N/mm$^2$) was measured by vertically pulling off the metal plates. Measurements were carried out with a universal test machine Walter & Bai PK-SRG 5000 with a load increase of 250 N/sec. Recorded were the adhesions strength and the EPS pull-out (area on the backside of the mortar that is covered with EPS in %) after 28 d storage at 23° C. and 50 r.H.

Test formulation was as follows (parts by weight): 99.85% of TM-1, 0.15% of the MEHEC of example 1 or the competitive products, respectively. Mixing water was 24%.

| | MEHEC of Ex 1 | Bermocoll M30 | Tylose MH15000P6 | Culminal MHEC15000PFF | Walocel MKX15000PF01 |
|---|---|---|---|---|---|
| Pull out (%) | 100 | 100 | 100 | 100 | 100 |
| Adhesion strength (N/mm2) | 0.16 | 0.15 | 0.17 | 0.15 | 0.16 |

Conclusion was that the new MEHEC leads to comparable adhesive strength.

Summarizing:

| | MEHEC of invention |
|---|---|
| Bulk density stability/Air pore stability | Better |
| Mortar consistency | Better |

-continued

| | MEHEC of invention |
|---|---|
| Mortar rheology, stability after 60 min | Better |
| Shear stability | Comparable to slightly better |
| Skin formation/wetting | better |
| Water retention DIN 18555-7 | comparable |
| Adhesive strength | comparable |

It was noted that when testing other MEHEC products of example 1, the products with a DSm of 1.6, or more, had slightly better properties.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A process to produce a powder mixture comprising from about 5 to about 90 percent by weight of a methyl ethyl hydroxyalkyl cellulose with a DSmethyl from 1.5 to 2.5, a DSethyl from 0.005 to 0.15, and a MS alkylene-oxide from 0.005 to 0.2 wherein the process comprises the step of dry mixing the methyl ethyl hydroxyalkyl cellulose and a powder comprising a polyvinyl alcohol.

2. The process of claim 1 wherein the methyl ethyl hydroxyalkyl cellulose has a DSmethyl of 1.6 to 2.5.

3. The process of claim 1 wherein the methyl ethyl hydroxyalkyl cellulose has a particle size such that the D10 is from about 27 to about 75 μm and the D98 is from about 200 to about 600 μm.

4. The process of claim 1 wherein the methyl ethyl hydroxyalkyl cellulose has a DSmethyl, DSethyl, and MSalkylene-oxide that results in a dissolution speed at pH=7 and a temperature of 20° C. such that the t1 is from about 0.1 to about 0.5 minutes and the t2 is from about 1 to about 10 minutes.

5. The process of claim 1 wherein the powder mixture is a redispersable powder suitable for use in mortars, comprising one or more additives for making mortars.

6. The process of claim 1 wherein the powder mixture comprises one or more water-soluble polymer other than methyl ethyl hydroxyalkyl cellulose.

7. A dry mortar mixture comprising 6 to 60 wt% of binder, based on the total amount of solid components of the dry mortar, and
from 0.1 to 0.5 percent by weight of a methyl ethyl hydroxyalkyl cellulose with a DSmethyl from 1.5 to 2.5, a DSethyl from 0.005 to 0.15, and a MSalkylene-oxide from 0.005 to 0.2, optionally comprising an anti-oxidant, whereby the methyl ethyl hydroxyalkyl cellulose optionally does not have a combination of a DSmethyl of 2.2 or 1.8, a DSethyl of 0.05 or 0.1, and a MSalkylene-oxide of 0.1 and does not have a combination of a DSmethyl of 2.5 or 2.0, a DSethyl of 0.1, and a MS alkylene-oxide of 0.05.

8. The mixture of claim 7 wherein the methyl ethyl hydroxyalkyl cellulose has a DSmethyl of 1.6 to 2.5.

9. The mixture of claim 7 wherein the methyl ethyl hydroxyalkyl cellulose has a particle size such that the D10 is from about 27 to about 75 μm and the D98 is from about 200 to about 600 μm.

10. The mixture of claim 7 wherein the methyl ethyl hydroxyalkyl cellulose has a DSmethyl, DSethyl, and MSalkylene-oxide that results in a dissolution speed at pH=7 and a temperature of 20° C. such that the t1 is from about 0.1 to about 0.5 minutes and the t2 is from about 1 to about 10 minutes.

11. The mixture of claim 7 that is a redispersable powder suitable for use in mortars, comprising one or more additives for making mortars.

12. The mixture of claim 7 that comprises one or more water-soluble polymer other than methyl ethyl hydroxyalkyl cellulose.

13. A process to make a mortar from the dry mortar mixture of claim 7 by mixing the dry mortar mixture with water.

* * * * *